3,284,374
PROCESS FOR POLYMERIZING OLEFIN OXIDES WITH A CATALYST CONSISTING OF AN ORGANOZINC COMPOUND AND AN AMINE
Hiroshi Daimon and Kosaku Kamio, Uozu-shi, Toyama-ken, and Shimpei Kojima, Namerikawa-shi, Toyama-ken, all of Japan, assignors to Nippon Carbide Kogyo Kabushiki Kaisha, Tokyo, Japan, a corporation of Japan
No Drawing. Filed Mar. 1, 1961, Ser. No. 92,458
Claims priority, application Japan, Mar. 5, 1960, 35/7,344; Mar. 16, 1960, 35/8,855; Apr. 26, 1960, 35/22,153; May 1, 1960, 35/23,282, May 14, 1960, 35/24,526
8 Claims. (Cl. 260—2)

This invention relates to the preparation of homopolymers and copolymers of olefin oxides. More particularly, this invention relates to the preparation of these polymers by homopolymerizing or copolymerizing olefin oxides in the presence of a catalyst system consisting of an organozinc compound and a specific cocatalyst.

The term "polymers" used in this application means homopolymers and copolymers, as well as the term "to polymerize" means to homopolymerize and to copolymerize. And the term "olefin oxides" means compounds having at least one epoxy group in the molecule.

Heretofore, it has been known that olefin oxides are polymerized in the presence of an organozinc compound as catalyst. However, when the polymerization of olefin oxides is carried out by using only an organozinc compound as catalyst, the yield of polymers obtained is very low. And the polymers produced by this polymerization show low molecular weight and low crystallinity. Further, when the olefin oxides to be polymerized are olefin oxides containing carbon atoms not less than three in the molecule, the polymerization of them in the presence of an organozinc compound only gives very poor results.

It is an object of this invention to polymerize olefin oxides into high molecular weight polymers in excellent yield.

It is a further object to produce olefin oxide polymers having the proper degree of crystallization depending on their applications desired.

It is a further object to produce olefin oxide polymers having high crystallinity which was difficult to obtain heretofore.

It is a further object to produce stable olefin oxide polymers.

It is a further object to produce olefin oxide polymers having olefinic double bonds and having no crosslinkage in the molecule.

Other objects of this invention will become apparent from the following description.

The olefin oxides which can be homopolymerized or copolymerized according to this invention include ethylene oxide, propylene oxide, butene oxide, isobutene oxide, epichlorohydrin, epibromohydrin, trifluoromethyl ethylene oxide, cyclohexene oxide, methylglycidyl ether, phenylglycidyl ether, butadiene oxide, butadiene dioxide, allyl glycidyl ether, glycidyl acrylate and styrene oxide.

We have found that a catalyst system consisting of at least one material (A) and at least one material (B) is effective for the polymerization of olefin oxides and the objects of this invention can be attained by using this catalyst system; wherein:

(A) is an organozinc compound having the general formula $ZnR^1R^2$ wherein $R^1$ and $R^2$ represents a hydrocarbon radical, and (B) is an organic compound having one amino radical.

The compounds of the class (A) include dimethylzinc, diethylzinc, dibutylzinc, dibutylzinc chloride and methylzinc chloride.

The compounds of the class (B) include lower aliphatic and aromatic amines such as: tributylamine, aniline, ethylene diamine, $\alpha$-naphthylamine, $\beta$-naphthylamine, benzidine, cyclohexylamine, diphenylamine, hexamethylenetetramine, triphenylamine, pyrrole, indole, pyridine and quinoline.

The effect of use of the both compounds belonging to the class (A) and the class (B) together is explained in the following as compared with the effect of use of each of them separately. That is, the polymerization of propylene oxide in a closed tube at 80° C. for 18 hrs. in the presence of diethylzinc of the class (A) as a single catalyst gives only liquid low molecular weight polymer. High polymers are not obtained under the same conditions in the presence of a compound belonging to the class (B) as a single catalyst. On the contrary, the polymerization of propylene oxide at 80° C. for 18 hrs. in the presence of a catalyst system consisting of compounds belonging to the classes (A) and (B) gives high polymer of propylene oxide in good yield. The molecular weight of polymers thus obtained amounts to several millions and the polymers are of high crystallinity.

Further, a large advantage of the polymerization method according to this invention consists in the point that compounds having the stabilizing effect on olefin oxide polymers are present in the class (B) and they act not only as cocatalyst, but also as stabilizer. The examples of compounds acting effectively as the stabilizer to olefin oxide polymers are amines, the other nitrogen-containing bases, their salts, phenols, quinones and the other antioxidants. Citing further in detail, they are triethanol amine, $\beta$-naphthyl amine, guanidine carbonate, tert-butyl phenol, hydroquinone and benzoquinone.

Propylene oxide polymer produced by polymerization with such stabilizer added does not change in its degree of polymerization even after one year standing, whereas the polymer produced without addition of such stabilizer shows a remarkable lowering of molecular weight after one year standing. Properties of olefin oxide polymers are depending on the kind of monomer, and the conditions of polymerization. The appearance of the polymers varies from rubber-like elastomer to hard resin-like polymer.

Further, the property can be improved by forming secondarily crosslinkages between olefin oxide polymer molecules to produce very useful synthetic resins or synthetic rubbers. There are various methods to form crosslinkage between olefin oxide polymer molecules. One of those methods is that an olefin oxide having olefinic unsaturated bond is homopolymerized or copolymerized to introduce the olefinic unsaturated bond into the polymer and the crosslinking reaction is carried out on moulding. Sometimes, the unsaturated bond of olefin oxide having olefinic unsaturated bond reacts during the polymerization to give crosslinked olefin oxide polymer.

The crosslinked polymer is generally moulded with great difficulty so that the occuring of crosslinking reaction during the polymerization is not desirable.

It has been found in this invention that the crosslinking reaction during the polymerization can be inhibited by adding a compound having the radical polymerization inhibitor action selected from compounds belonging to the class (B).

When the polymerization catalyst system of this invention is used, there is an advantage that such a radical polymerization inhibitor acts as a polymerization cocatalyst for olefin oxides, and the molecular weight and the polymerization yeld can be increased. However, a method of inhibiting the crosslinking reaction by adding a radical polymerization inhibitor and admixing is not limited to the polymerization catalyst system of this invention. The crosslinking reaction during polymerization in the other olefin oxide polymerization catalyst systems, such as organic aluminium compound system and ferric chloride system also can be inhibited by adding a radical polymerization inhibitor in the same way. The examples of compounds acting effectively as radical polymerization inhibitor are nitrogen-containing bases, their salts, phenols, quinones, nitro compounds, sulfur, etc. Generally a polymerization inhibitor of vinyl polymerization can be effectively used.

In the method of this invention, compounds belonging to the classes (A) and (B) react each other in an optional method, and form active catalysts. They can be sufficiently used merely by mixing both of them simply. A compound belonging the class (B) is dissolved or dispersed in a suitable inert organic solvent, for example, ether, hexane, toluene, etc., and an organozinc compound is added therein. Immediately after the reaction, the mixture can be used. And also the mixture may be allowed to stand at room temperature for a long time in order to carry out the reaction completely or it may be subjected to a heat treating and then it may be used.

The ratio of the compound of the class (A) to the compound of the class (B) can be 1 part: 0.001–10000 parts, preferably 1 part: 0.01–10 parts, but it need not to be an integer ratio stoichiometrically.

In the polymerization of this invention, the amount of polymerization catalyst is not particularly limited, but in general the amount of the organozinc compound to the monomer ranges from 0.001 mol percent to 10 mol percent, preferably from 1 mol percent to 5 mol percent.

The polymerization method of this invention can be carried out in a wide range of temperature, that is, at $-20°$ C.–$300°$ C., preferably $0°$ C.–$200°$ C.

In the method of this invention, it is preferable to use a diluent, because it facilitates the polymerization operation. As the diluent, inert solvents are generally used to the monomer. Among the examples of the inert solvents are: ethers such as diethyl ether, diisopropyl ether and the like, aromatic hydrocarbons such as benzene, toluene and the like, aliphatic or cycloaliphatic hydrocarbons such as n-hexane, n-heptane, cyclohexane, petroleum ether, petroleum benzine, and the like, and halogenated hydrocarbons such as chlorobenzene, methylene chloride, chloroform, carbon tetrachloride and the like. And also those can be used as a mixture.

In the following examples, all "part" and "percent" are based on weight unless otherwise specified.

*Example 1*

Air in a stainless steel vessel of 100 ml. volume was replaced with nitrogen. n-Hexane (10 parts), cyclohexylamine (0.3 part), and n-hexane (2 parts) containing diethylzinc (0.3 part) were added to the stainless steel vessel and mixed. And 10 parts of propylene oxide added and the vessel was closed and placed in a thermostat of $80°$ C. After 18 hours, the closed vessel was cooled and the resulting polymer product was taken out. The polymer product was dried under vacuum at room temperature. Thus, 10.7 parts of crude product were obtained. If the amount of catalyst contained is taken into consideration, the polymer yield is 100%. The polymer thus obtained was a white and tenacious substance. The intrinsic viscosity $[\eta]$ measured as benzene solution was 19.8 at $30°$ C. Calculating from the equation $[\eta]=1.4 \times 10^{-4}M^{0.8}$, the molecular weight is $2.08 \times 10^6$. It was ascertained by the X-ray diffraction diagram and the observation with a polarizing microscope that the polymer was highly crystalline polymer.

The polymer thus obtained was heated for one hour at $175°$ C. and almost no loss in the weight was recognized.

After one year standing, the molecular weight of the polymer was found unchanged.

*Examples 2–8*

In these examples, the following compound was used as cocatalyst in place of cyclohexylamine in Example 1. The value of polymerization yield is calculated from the the amount of the dried polymer product less the amount of catalyst contained therein.

| Example | Co-catalyst | (Mol. percent) | Polymer weight (percent) |
|---|---|---|---|
| 2 | Tri-n-butylamine | 0.5 | 37 |
| 3 | β-Naphthylamine | 1 | 90.5 |
| 4 | Diphenylamine | 2 | 96.5 |
| 5 | Benzidine | 1 | 47 |
| 6 | Pyrrole | 0.5 | 79.5 |
| 7 | Indole | 0.5 | 87 |
| 8 | Pyridine | 3 | 30 |

*Example 9*

The same procedure as in Example 1 was used, except ethylene oxide being used in place of propylene oxide in Example 1. Thus, 10.2 parts of rigid white polymer of ethylene oxide was obtained. The polymer yield was 97%.

*Example 10*

The same procedure as in Example 1 was used, except for a polymerization temperature of $100°$ C. and a polymerization time of 5 hours. Thus, white solid high polymer was obtained in 100% yield.

*Example 11*

Air in stainless steel vessel was replaced with nitrogen gas. n-Hexane solution (3 parts) containing 0.3 part of diethylzinc, and 0.25 part of aluminium hydroxide, and 0.15 part of p-benzoquinone were added to the vessel. Further, 9.5 parts of propylene oxide and 0.5 part of allyl glycidylether were also added, and the vessel was closed and placed in a thermostat of $80°$ C. After 18 hours, the vessel was cooled, and the resulting polymer product was taken out and dried under vacuum at room temperature. Thus, 9.1 parts of crude product were obtained. If the amount of catalyst contained is taken into consideration, the polymer yield is 84%. The polymer product thus obtained was poor in elasticity, soluble in benzene, and was found to have no crosslinking between the molecules. This polymer (100 parts), 5 parts of sulfur, and 5 parts of tetramethylthiuram disulfide were mixed with roll at room temperature. The resulting mixture was subjected to the heat treatment at $160°$ C. for 5 minutes to give a substance which was completely insoluble in benzene and of rubber-like elasticity.

The polymer product polymerized without adding 0.15 part of p-benzoquinone was insoluble in benzene and crosslinked. Therefore, the moulding was extremely difficult.

*Examples 12–13*

The same procedure as in Example 11 was used in these examples, except the following compounds being employed as radical inhibitor or cocatalyst in place of p-benzoquinone in Example 11.

In each case, a polymer soluble in benzene was obtained.

| Example | Radical Inhibitor | Mol Percent | Polymer Yield, Percent |
|---|---|---|---|
| 12 | N.N'-diphenyl-p-phenylene diamine | 1.0 | 54 |
| 13 | Phenyl β-naphthylamine | 2.0 | 80 |

We claim:

1. A method comprising polymerizing olefin oxides having less than 12 carbon atoms at 0 to 200° C. in the presence of a catalyst system consisting of 0.001–10 mole percent, based on the monomer, of at least one organozinc compound of the formula $ZnR_1R_2$, wherein $R_1$ and $R_2$ are selected from the group consisting of lower alkyl and aryl groups and 0.01 to 10 parts by weight, based on said first material, of a second material selected from the group consisting of lower aliphatic and aromatic amines.

2. A method according to claim 1 wherein said first material is diethyl zinc and the second material is cyclohexylamine.

3. A method according to claim 1 wherein said first material is a dialkylzinc compound.

4. A method according to claim 1 wherein said second material selected from the group consisting of amines having cycloaliphatic groups.

5. A method according to claim 4 wherein said second material is cyclohexyl amine.

6. A method according to claim 1 wherein the olefin oxide is ethylene oxide.

7. A method according to claim 1 wherein the olefin oxide is propylene oxide.

8. A method according to claim 1 wherein the olefin oxides contain both epoxy and olefinic groups and are polymerized into solid polymers.

References Cited by the Examiner

UNITED STATES PATENTS 2,870,100  1/1959  Stewart et al. _____ 260—47

FOREIGN PATENTS 550,445  2/1957  Belgium.
1,248,137  10/1960  France.

OTHER REFERENCES

Furukawa, Journal of Polymer Science, vol. 36, pp. 541–3, April 1959.

JOSEPH L. SCHOFER, *Primary Examiner.*

PHILIP E. MANGAN, JOSEPH R. LIBERMAN, LEON J. BERCOVITZ, JAMES A. SEIDLECK,
*Examiners.*

N. G. TORCHIN, R. A. BURROUGHS, M. P. HENDRICKSON, W. HOOVER,
*Assistant Examiners.*

Notice of Adverse Decision in Interference

In Interference No. 96,353 involving Patent No. 3,284,374, H. Daimon, K. Kamio and S. Kojima, PROCESS FOR POLYMERIZING OLEFIN OXIDES WITH A CATALYST CONSISTING OF AN ORGANOZINC COMPOUND AND AN AMINE, final judgment adverse to the pantentees was rendered Aug. 28, 1970, as to claims 1, 3, 6, 7 and 8.

[*Official Gazette November 17, 1970.*]